(12) United States Patent
Gaither

(10) Patent No.: US 6,309,714 B1
(45) Date of Patent: *Oct. 30, 2001

(54) DECORATIVE SUBMERSIBLE FISH TANK SCULPTURE

(76) Inventor: Robert S. Gaither, 1046 Via Coralla, San Lorenzo, CA (US) 94580

( * ) Notice: Subject to any disclaimer, the term of this patent is extended or adjusted under 35 U.S.C. 154(b) by 0 days.

This patent is subject to a terminal disclaimer.

(21) Appl. No.: 09/609,047

(22) Filed: Jun. 30, 2000

Related U.S. Application Data

(63) Continuation-in-part of application No. 09/169,749, filed on Oct. 9, 1998, now Pat. No. 6,083,576.

(51) Int. Cl.$^7$ ...................................................... A47G 1/12
(52) U.S. Cl. .......................... 428/13; 428/34.1; 428/34.4; 428/542.2; 119/256
(58) Field of Search ................................. 428/34.4, 34.1, 428/542.2, 13; 264/320, 328.1; 119/253, 256; D30/101, 106

(56) References Cited

U.S. PATENT DOCUMENTS

| | | | |
|---|---|---|---|
| 4,318,945 | * 3/1982 | Goldman et al. | 428/15 |
| 4,385,088 | * 5/1983 | Baskin | 428/15 |
| 4,708,089 | * 11/1987 | Goldman et al. | 119/5 |
| 4,820,556 | * 4/1989 | Godman et al. | 428/7 |
| 4,974,545 | * 12/1990 | Jones | 119/5 |
| 5,257,596 | * 11/1993 | Jones | 119/256 |
| 5,970,918 | * 10/1999 | Bargy | 119/245 |
| 6,083,576 | * 3/1982 | Gaither | 428/13 |

* cited by examiner

Primary Examiner—Blaine Copenheaver
Assistant Examiner—Abraham Bahta
(74) Attorney, Agent, or Firm—Wells, St. John, Roberts, Gregory & Matkin

(57) ABSTRACT

A decorative submersible sculpture is described in which a submersible hollow body is formed with a peripheral wall structure. The wall structure defines an internal receptacle of a prescribed decorative shape that is configured to be filled by a visually opaque particulate medium and formed by the internal receptacle into the prescribed decorative shape. At least part of the wall structure is transparent and configured in such a manner that when the receptacle is filled with visually opaque particulate medium, the medium takes the form of the prescribed decorative shape and is visible through the transparent part or parts of the wall structure. The decorative shape will visually appear to be in a solid, self-supporting state, and the transparent parts of the wall structure will be substantially invisible.

19 Claims, 8 Drawing Sheets

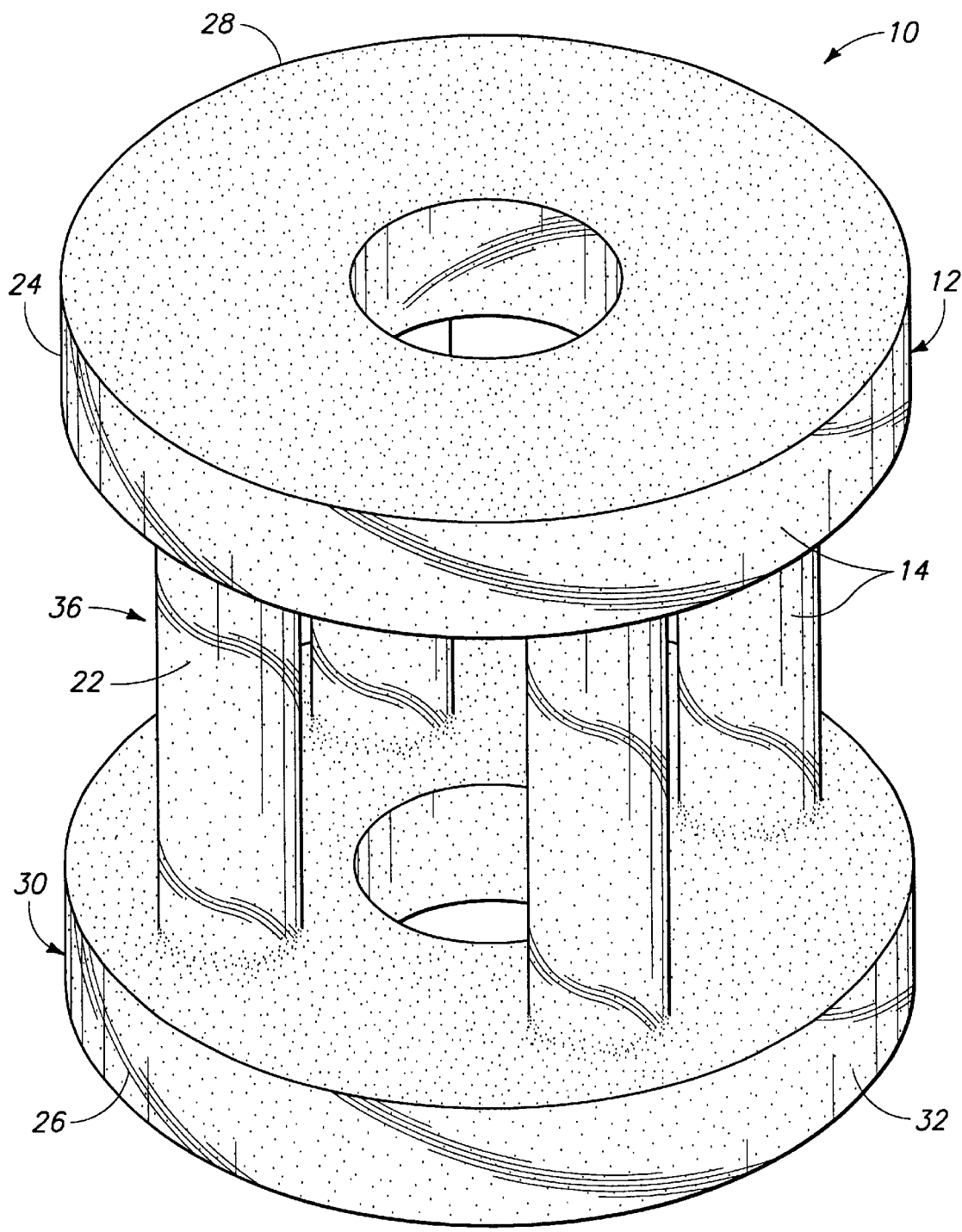

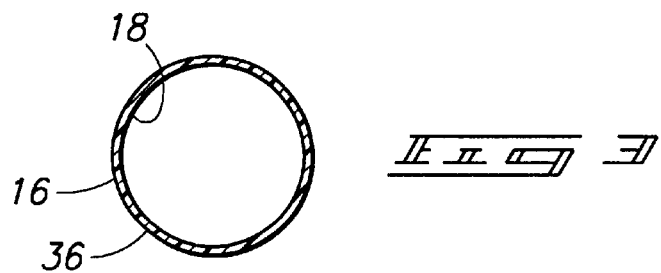
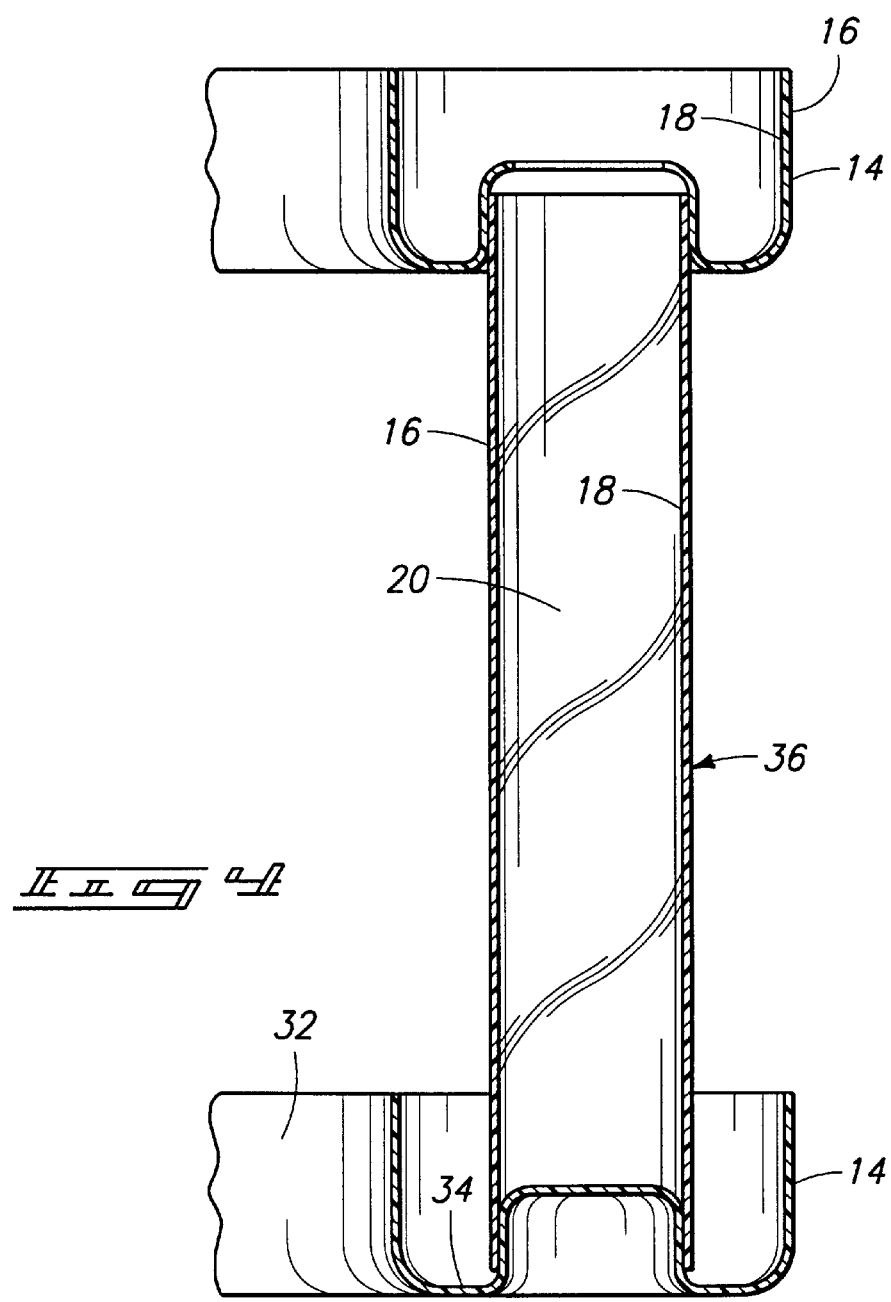

DECORATIVE SUBMERSIBLE FISH TANK SCULPTURE

RELATED APPLICATIONS

This application is a continuation-in-part of U.S. Application Ser. No. 09/169,749, filed on Oct. 9, 1998 now U.S. Pat. No. 6,083,576.

TECHNICAL FIELD

The present invention relates in general to a decoration and more particularly to submersible decorative sculptures.

BACKGROUND OF THE INVENTION

While the present sculpture is best used in aquariums under water, use may be found in other containers such as terrariums, or as a stand-alone decoration. Since preferred use is inside fish tanks, the following description will be given using a fish tank as an example.

It is common practice for those who enjoy tropical, fresh or saltwater fish, or other aquatic life to provide a habitat within a transparent "fish tank." It is also common that the fish tank be supplied with various decorations to improve visual aesthetics and to lend some measure of variety and habitat for the animals in the tank.

It is desirable to cover the bottom surfaces of fish tanks with an appropriate aquarium gravel. Such gravel functions as a filter medium and contributes to a more natural habitat for the animals. Aquarium gravel also becomes part of a fish tank decoration, and can be purchased in various colors.

Typical fish tank decorations are formed as submersible ceramic sculptures that are intended to rest on the gravel surface. The sculptures may be provided in many different forms, but all (to the present inventor's knowledge) are generally opaque and contrast significantly from the fish tank gravel. There is little color or texture choice for the fish tank owner. Further, the sculptures are typically relatively expensive and some are fragile and difficult to clean.

An object of the present invention is provide a submersible fish tank sculpture that will enable the fish tank owner a choice for decorative color and texture by providing the sculpture in a hollow form that is at least partially transparent and that can be filled with fish tank gravel or other particulate materials. Thus the fish tank owner has a variety of choices for coloration of the transparent parts of the sculpture.

The present sculpture also has for an objective to provide a submersible sculpture that, when filled with gravel or the like, forms the material into a particular decorative shape. Thus, if a fish tank owner would like a decoration to blend better visually with the aquarium gravel in the tank, the receptacle may simply be filled with the same gravel material used to cover the fish tank bottom. The sculpture will then appear to be an integral part of the gravel bottom, but will be clearly visible above the gravel bed. This lends an interesting and striking visual dimension to the otherwise ordinary-appearing fish tank.

The above and still further objects and advantages will become apparent from the following detailed description which, when taken with the accompanying drawings, disclose a preferred mode of the present invention.

BRIEF DESCRIPTION OF THE DRAWINGS

Preferred embodiments of the invention are described below with reference to the following accompanying drawings.

FIG. 2 is a view of the sculpture shown in FIG. 1 only showing the sculpture filled with particulate material such as aquarium gravel;

FIG. 3 is an enlarged fragmented detail sectional view taken along line 3—3 in FIG. 1;

FIG. 4 is an enlarged fragmented detail sectional view taken along line 4—4 in FIG. 1;

DETAILED DESCRIPTION OF THE PREFERRED EMBODIMENTS

Figure 1:
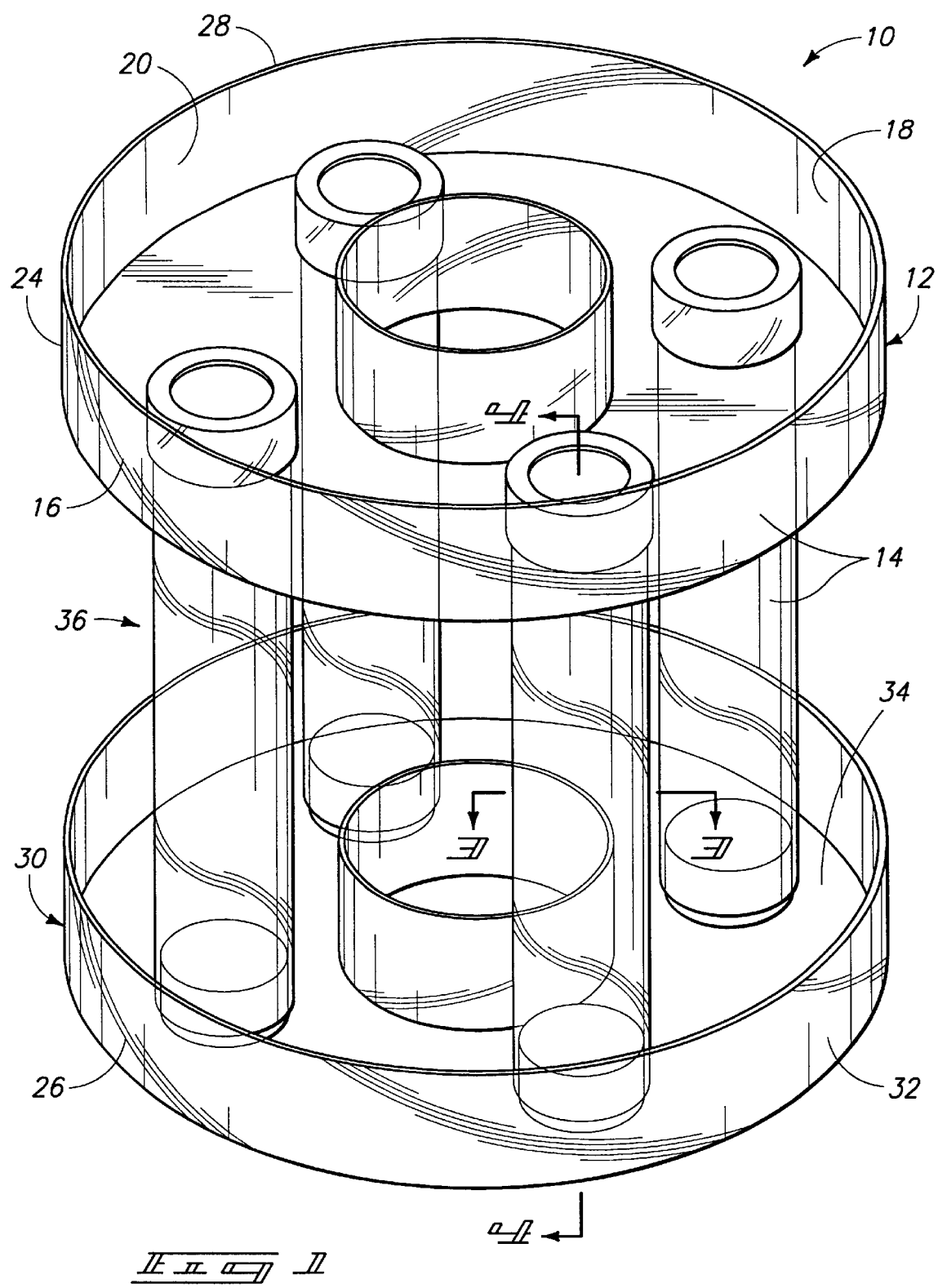
FIG. 1 is a perspective view of a preferred exemplary fish tank sculpture including features of the present invention.

This disclosure of the invention is submitted in furtherance of the constitutional purposes of the U.S. Patent Laws "to promote the progress of science and useful arts" (Article 1, Section 8).

Preferred forms of the present decorative submersible sculpture 10 are shown in FIGS. 1–9 of the accompanying drawings. Still further forms that are not shown may be readily devised from the teachings of this disclosure. Like reference numerals will be used to identify common elements of each embodiment exemplified herein.

In general, the present sculpture is comprised of a submersible hollow body 12 formed by a peripheral wall structure 14. The preferred wall structure 14 is formed of a substantially neutral or more preferably a non-buoyant plastic. Forms of plastic are preferred that can be heat formed or injection molded by conventional processes.

It is pointed out that at least a portion of the wall structure 14 is transparent. As used herein, the term "transparent" should be understood as including a range from optically clear, which is most preferable, to translucent yet sufficiently clear to enable visual access to the interior of the structure. It should also be understood that the transparent plastic may or may not be colored.

The preferred wall structure is rigid and the transparent portion or portions include a thickness dimension that is no greater than approximately 0.25 inches. The thickness dimension may vary upwardly in any areas of the structure that are not transparent, since light transmission and refractive index are not issues of concern in such areas. It has been found, however, that transparent areas having thicknesses greater than 0.25 inches tend to frustrate the intent of the present invention, which is to provide such areas in a shell structure that will become substantially invisible when submerged. It has been found that transparent areas of the structure with wall thickness dimension greater than 0.25 inches tend to become undesirably visible underwater.

In preferred forms, the wall structure 14 includes an external surface 16 that may be substantially smooth and undecorated. This part of the sculpture may also be opaque and therefore be formed of thicker material, with particular decorative surfaces simulating stone, wood or other material.

With regard to those parts of the sculpture which are transparent, no external surface decoration is required, since the form of the sculpture is substantially dictated by the shape of an internal surface 18. Thus in any of the transparent areas (which may be the complete sculpture or as little as approximately 66% of the frontal exposed external surface area), it is the internal surface 18 that closely defines the shape of the sculpture. The external configuration of the transparent areas may be of a similar shape, due to forming techniques, but is not readily visible under water, and need not closely define the sculptural configuration.

It is preferred that the external surface of the transparent portions be relatively smooth or textured so as not to cause any undesired reflections. A smooth external surface thus contributes to the "invisible" appearance of the transparent portions of the wall 14 when submerged.

The internal surface 18 of the wall structure defines an internal receptacle 20 of a prescribed decorative shape that is configured to be substantially filled by a visually opaque particulate medium 22 (FIG. 2) such as aquarium gravel, sand, or another particulate material. The medium 22 may be poured into the receptacle 20 to be formed by the receptacle 20 into the prescribed decorative shape. Once again, the shape defined may be any of a variety of decorative configurations, as indicated by the examples illustrated.

The preferred hollow body includes a top 24 and a bottom end 26. It also includes at least one top, upwardly facing opening 28 (also note the several additional openings 28a in the FIG. 9 configuration) formed in the hollow body and opening into the receptacle. The opening 28 and openings 28a are configured to receive particulate materials. The openings face substantially upwardly so particulate medium may be poured into the receptacle 20 and then span the opening or openings (when the receptacle is filled) without spilling over or adversely affecting the configuration of the sculpture. Each opening is provided in such a manner that the particulate material spanning the opening will form a visual part of the sculpture (see FIG. 2).

Figure 9:
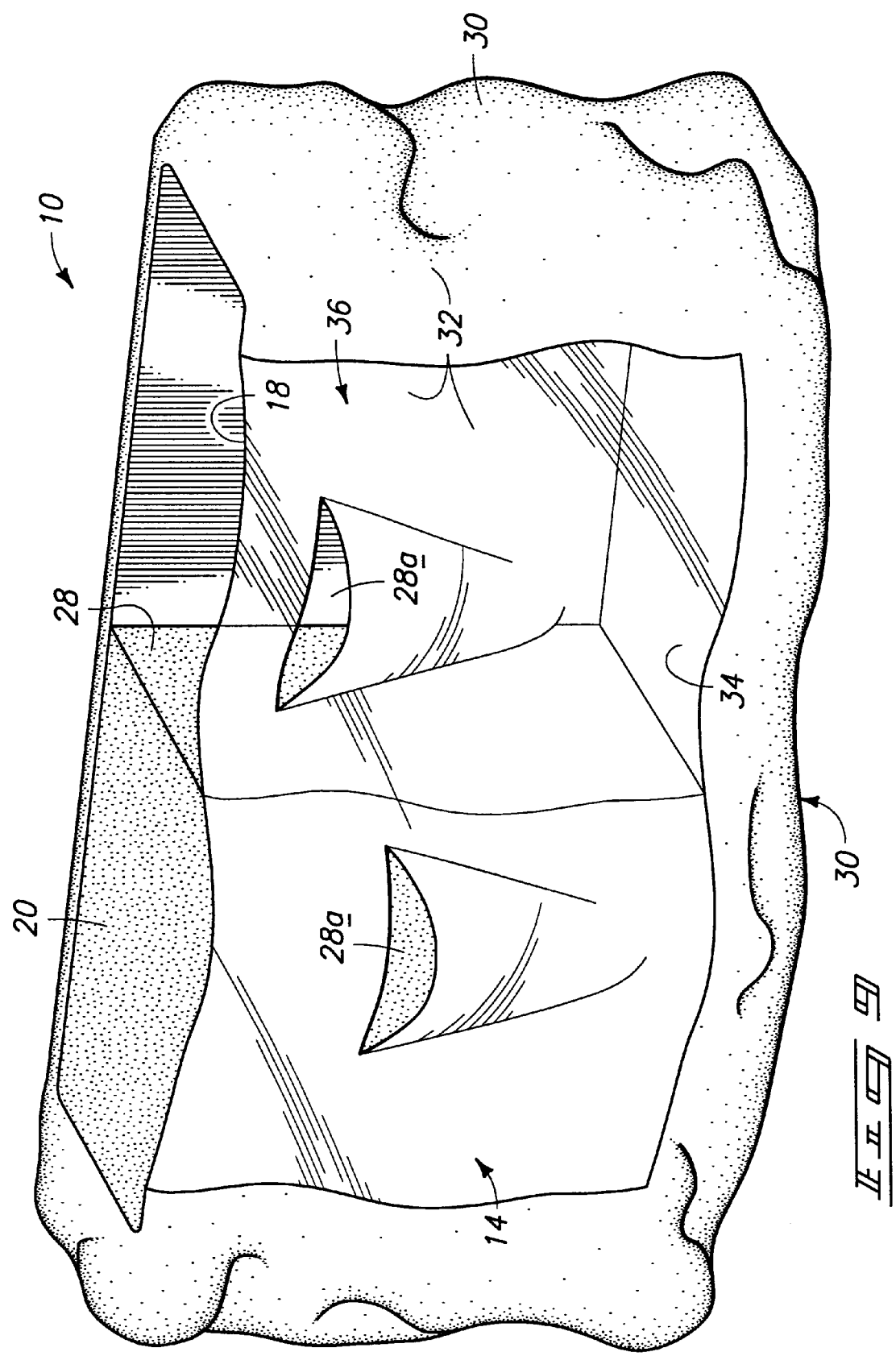
FIG. 9 is a perspective view of another form of the present sculpture with portions formed as a background with a substantially transparent front surface.

The intermediate openings 28a shown in the transparent portion of the sculpture example shown in FIG. 9 are formed by louver shapes, preferably formed in the transparent portion or portions of the sculpture. These shapes may form ledges with particulate fill being exposed along the top surface of the openings 28a.

Thus, the portion or portions of the wall structure that are transparent are configured such that when the receptacle is at least substantially filled with visually opaque particulate medium 22, the medium is formed into the prescribed decorative shape and is visible through those parts of the wall structure that are transparent. The particulate medium thus will appear to be in a solid, self-supporting state. The transparent parts of the wall structure become substantially invisible when submerged in the fish tank. The result is a strikingly decorative, solid-appearing structure of an apparent texture and coloration (along the transparent portions) that is chosen by the user.

The particular form illustrated in FIGS. 1–5 exemplifies details of a preferred construction. It is noted that the wall configuration shown is consistent in thickness and that the entire wall surface may be transparent. However, it should be understood that portions of the wall could also be opaque (as exemplified by FIGS. 8 and 9), leaving select portions transparent. The transparent parts of the walls are preferred in this form to maintain a consistent visual appearance and to enable the adjacent shape to be formed by conventional relatively inexpensive techniques with minimal numbers of parts.

Figure 5:
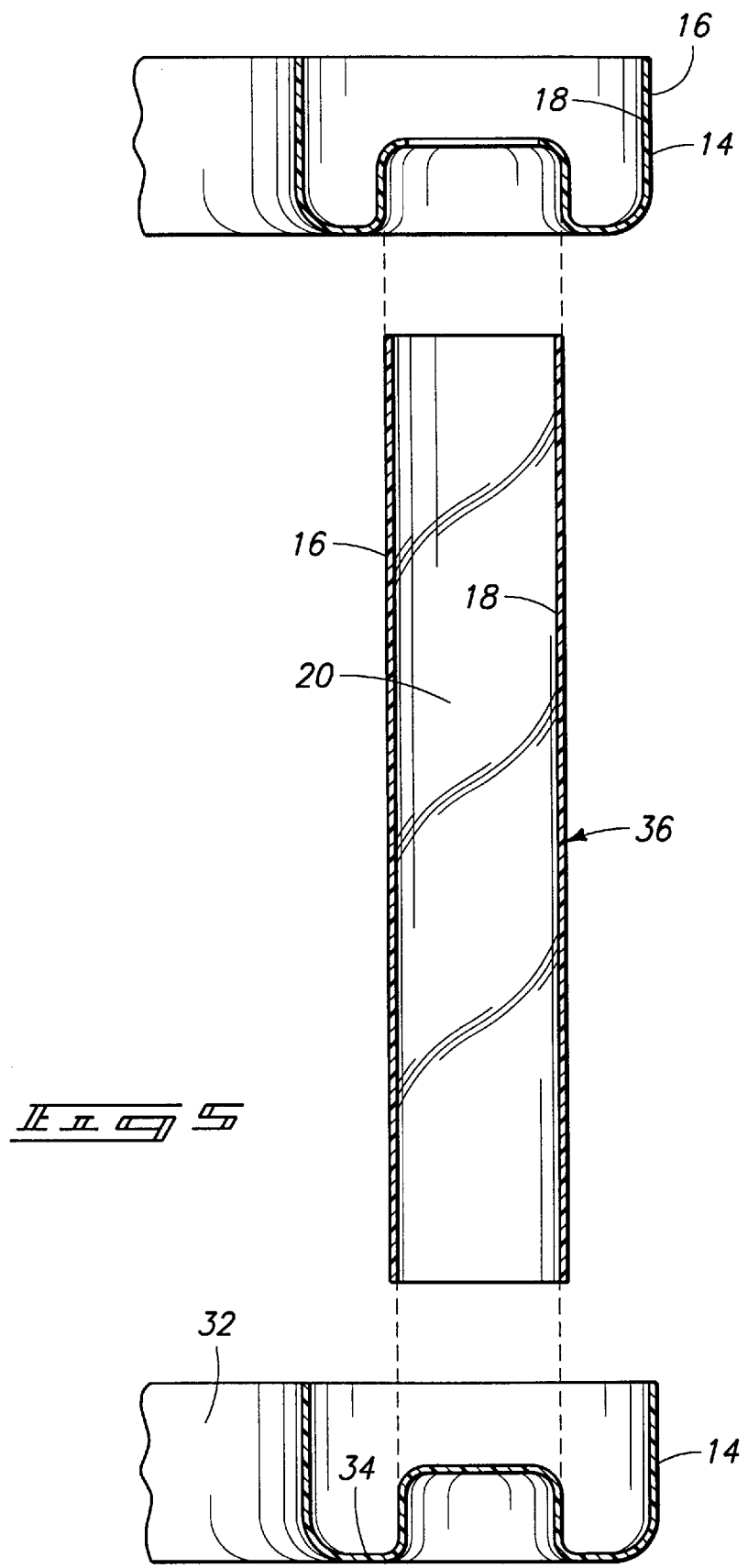
FIG. 5 is an exploded view showing components of the exemplary sculpture separated.

It is also noted, especially in FIGS. 4 and 5, that the sculpture may be produced in several interfitting sections. This presents an advantage of reducing shipping and storage size, and allows for easy assembly by the ultimate purchaser. This is also an advantage for the user who may wish to clean the sculpture periodically, then re-fill the receptacle with fresh particulate medium.

The above brings up a still further advantage of the present sculpture. The particulate medium may function not only as a decoration when in a fish tank, but also as a filter medium. Thus, the sculpture has a distinct utilitarian function in addition to a unique aesthetic appearance.

More specifically, each of the configurations shown includes a base 30 (which may be transparent, opaque, or open) with a peripheral side wall 32 projecting upwardly from a bottom 34. In the examples shown by FIGS. 1–7, at least a portion and possibly all of the side walls are transparent.

Figure 6:
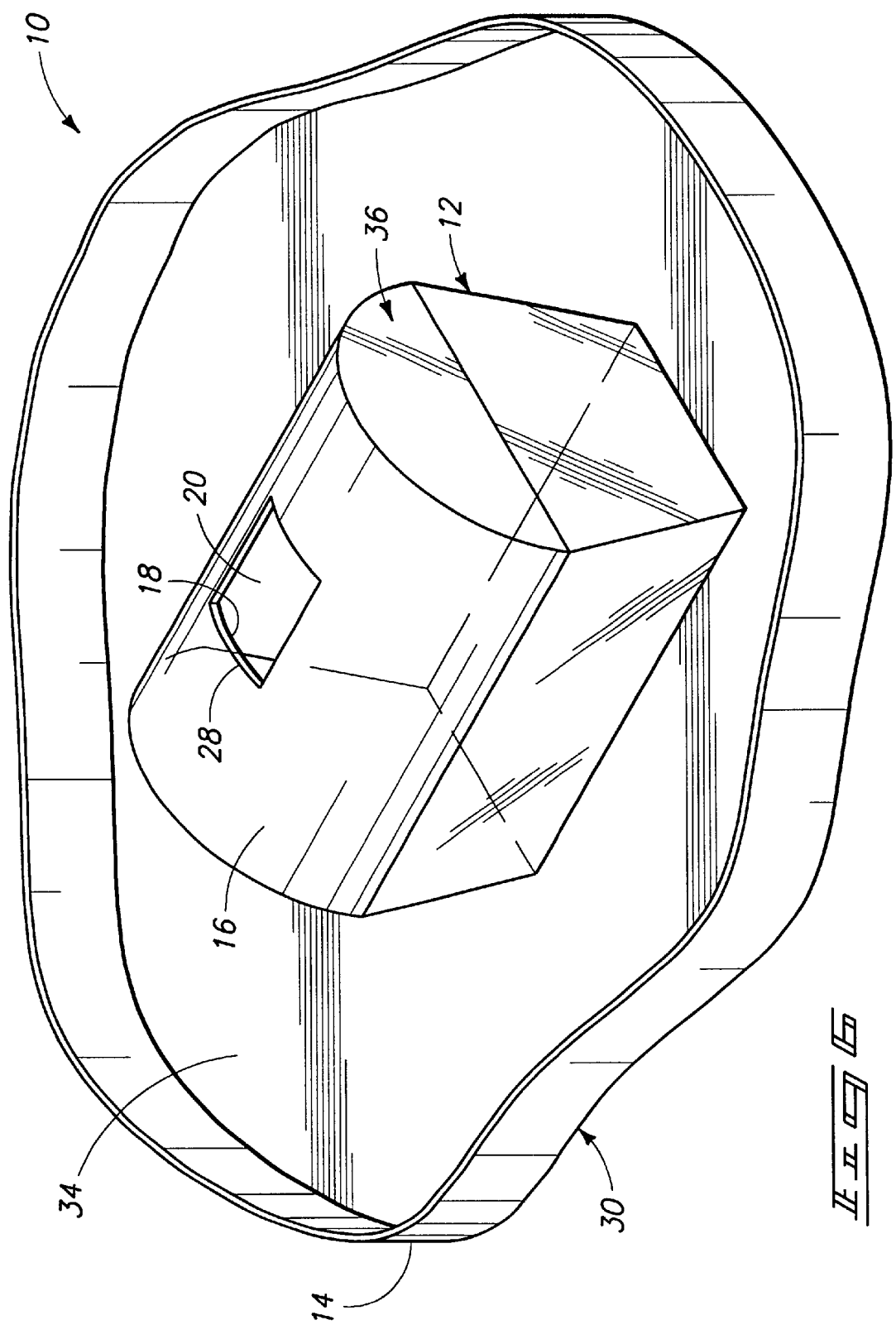
FIGS. 6 and 7 are exemplary views showing other decorative forms that the present sculpture may take.
Figure 7:
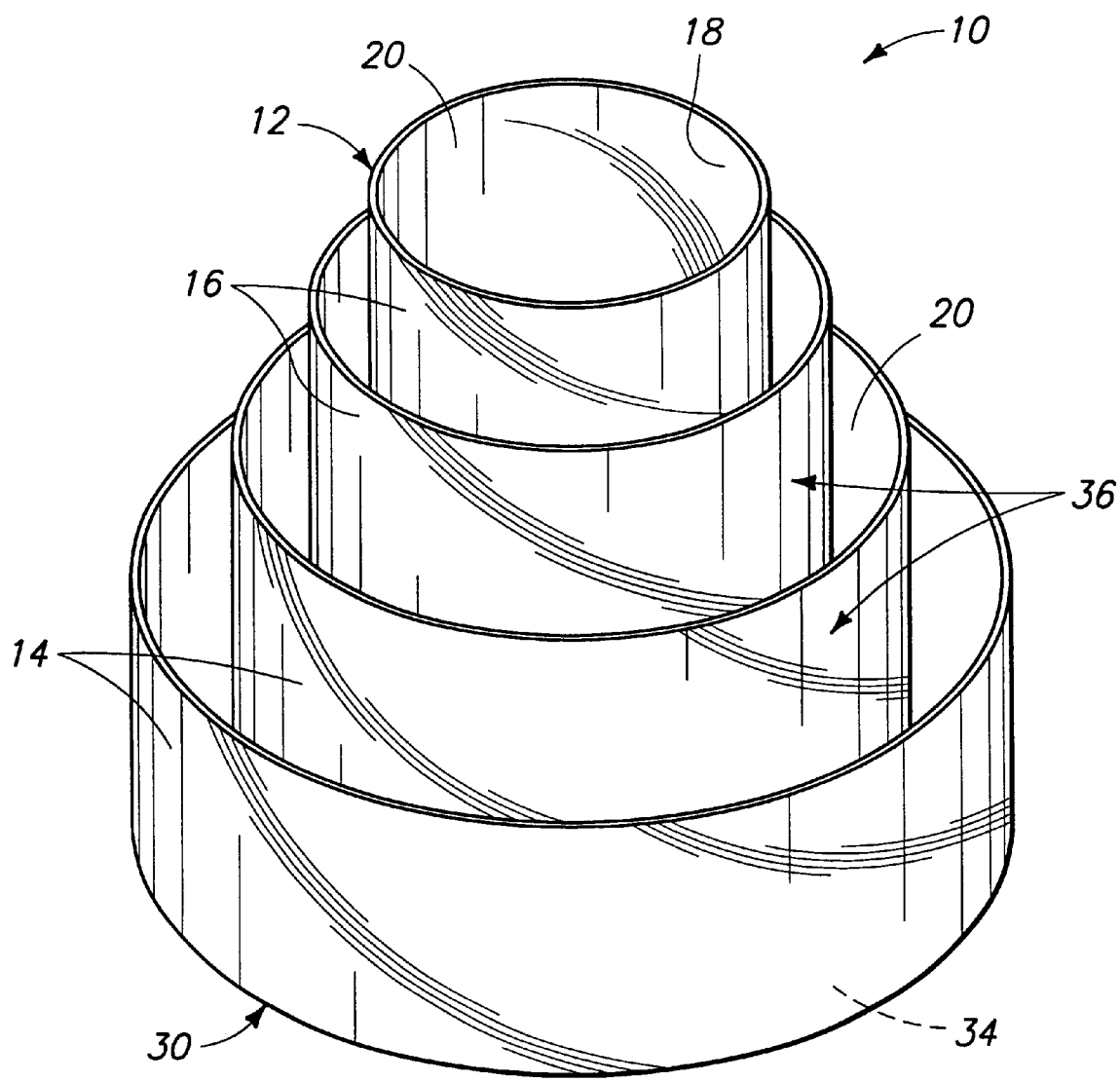
Figure 8:
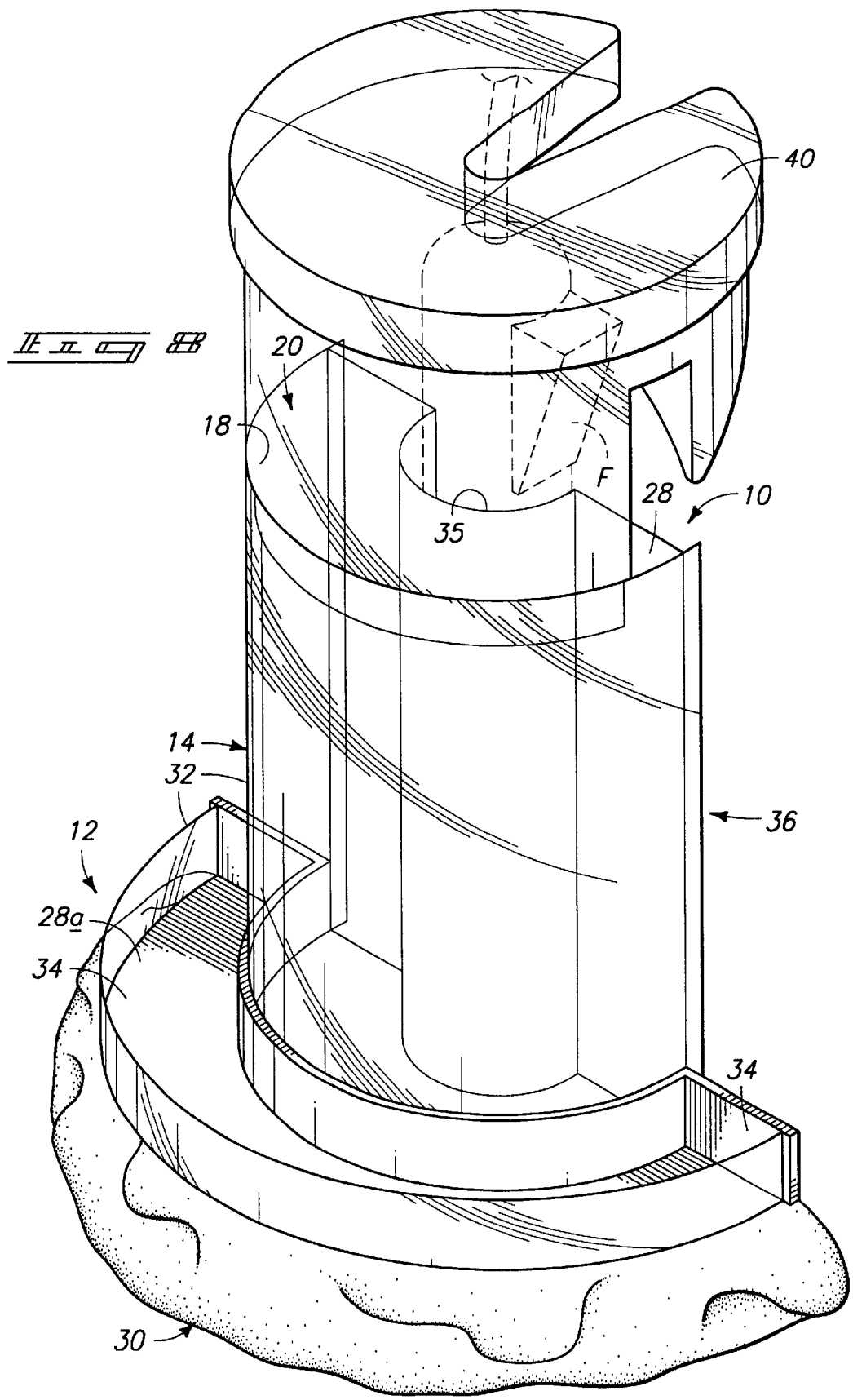
FIG. 8 is a perspective view of another form of the present sculpture with portions formed to fit over or against a fish tank filter element.

Also in the preferred forms, at least one hollow upright member 36 extends upwardly relative to the base 30 or bottom wall 34, to define the internal surface 18 of a prescribed decorative configuration. In FIG. 1, the upright member is a series of columns with a tray configuration at the column tops. In FIG. 6, the upright portion is shaped somewhat like a treasure chest. In FIG. 7, the upright portion is formed by concentric tubular members. In FIG. 8, the upright is semi-cylindrical with a backing (which may be opaque) that includes a formed indentation 35 for reception of a common fish tank filter F. In FIG. 9, the base 30 is integrated with the hollow upright 36 and includes a forward-facing transparent portion.

The base 30 and hollow upright member 36 are configured to receive solid particulate materials to form a visible decorative structure through those portions of the side wall which are transparent and which will become substantially invisible when submerged. The opening or openings in the hollow upright member are configured to receive solid particulate materials and provide open access to the internal surface.

Solid particulate materials 22 filling the internal receptacle will be visible through the transparent portions of the wall structure and visually appear in water as a solid body of the prescribed decorative shape.

It is pointed out that the open top portions of the receptacle may, if desired, be covered by a cap 40 (see the example illustrated in FIG. 8) or other appropriate cover. However, it may also be desirable to leave the top portions open as shown in FIG. 2, to leave the filler medium visible and useful for filtering purposes.

To use the present sculpture, the user simply assembles the various sections (if the sculpture is so provided). Now a selected particulate medium is poured into the receptacle through the upwardly facing opening or openings to the level of the opening or openings, filling the receptacle. The particulate material spanning the opening or openings will form a top surface of the sculpture, as exemplified by FIG. 2. This completes formation of the sculpture and all that is left is to submerge the sculpture in the fish tank. This is done by slowly lowering the sculpture into the water, allowing the air in the receptacle to be gradually displaced with water (which enters through the opening or openings). The weight of the sculpture will then allow it to descend to the bottom of the tank, at any location selected by the user.

A preferred process for producing a decorative submersible fish tank sculpture includes the following steps:

1. Providing a hollow submersible body at least a portion of which is transparent and having an external surface (16) and an internal surface (18); and
2. Forming the internal surface into a receptacle of a decorative shape and configured to be filled with a visually opaque particulate medium wherein said medium is visible through said transparent portion and appears to be in a solid, self-supporting state and said transparent portion is substantially invisible.

The above steps may be performed using a transparent plastic material and heat-forming or molding techniques. This is preferably accomplished while forming the transparent parts of the external surface (16) to be substantially smooth and undecorative, again to minimize the chance that the external surface will become visible when submerged.

It is further preferred that the forming step be completed in such a manner that the wall thickness of the transparent parts not surpass 0.25 inches. This is preferred as indicated above, to minimize the chance that the wall material will become visible when submerged.

It is also preferred that a further step include providing an opening (28) in the hollow submersible body leading into the receptacle (20). The preferred opening may be formed in the forming or molding process, or the opening may be cut following formation of the hollow body.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A decorative submersible sculpture, comprising:

a submersible hollow body comprising a peripheral wall structure;

wherein at least a portion of the peripheral wall structure is transparent;

wherein the peripheral wall structure defines an internal receptacle of a decorative shape and said receptacle is configured to be filled with visually opaque particulate medium;

such that the medium is formed into the decorative shape and is visible through the transparent portion and visually appears to be in a solid state, and the transparent portion is substantially invisible.

2. The decorative submersible sculpture as recited by claim 1 wherein the wall structure is formed of a substantially non-buoyant plastic.

3. The decorative submersible sculpture as recited by claim 1 wherein the wall structure includes an external surface that is smooth and undecorated.

4. The decorative submersible sculpture as recited by claim 1 wherein the wall structure is rigid and the transparent portion includes a thickness dimension that is no greater than approximately 0.25 inches.

5. The decorative submersible sculpture as recited by claim 1 wherein the hollow body includes a top and a bottom end and further comprising an opening leading into the receptacle adjacent the top end, said opening being configured to receive particulate materials.

6. The decorative submersible sculpture as recited by claim 1 wherein the hollow body includes an opening leading into the receptacle, said opening configured to receive particulate materials.

7. A process for producing a decorative submersible fish tank sculpture, said process comprising: providing a hollow submersible body at least a portion of which being transparent and having an external surface and an internal surface; forming the internal surface into a receptacle of a decorative shape and configured to be filled with a visually opaque particulate medium wherein said medium is visible through said transparent portion and appears to be in a solid, self supporting state and said transparent portion is substantially invisible.

8. The process for producing a decorative submersible fish tank sculpture as defined by claim 7, comprising a further step of providing an opening in the hollow submersible body leading into the receptacle.

9. The process for producing a decorative submersible fish tank sculpture as defined by claim 7, wherein the external surface is substantially smooth.

10. The process for producing a decorative submersible fish tank sculpture as defined by claim 7, wherein the transparent portion is comprised of transparent plastic material.

11. The process for producing a decorative submersible fish tank sculpture as defined by claim 7, wherein the transparent portion is formed of a transparent plastic material having a thickness dimension between the external and internal surfaces of no greater than approximately 0.25 inches.

12. A decorative submersible fish tank sculpture, comprising:

a base with a peripheral side wall projecting upwardly from a bottom wall;

a hollow upright member, including a transparent portion, said hollow upright member extending upwardly relative to the base bottom wall, and defining an internal surface of a prescribed decorative configuration;

said base and hollow upright member being configured to receive solid particulate materials to form a visible decorative structure with the transparent portion being substantially invisible;

an opening in the hollow upright member providing open access to the internal surface and configured to receive solid particulate materials therethrough; and whereby solid particulate materials filling the internal receptacle will be visible through the transparent portion of the hollow upright member and will visually appear in water as a solid body.

13. The decorative submersible fish tank sculpture as recited by claim 12 wherein the side wall and hollow upright member are comprised of a substantially non-buoyant transparent plastic.

14. The decorative submersible fish tank sculpture as recited by claim 12 wherein the side wall and hollow upright member include external surfaces that are substantially smooth.

15. The decorative submersible fish tank sculpture as recited by claim 12 wherein the side wall and hollow upright member are rigid and wherein said transparent portion includes a common thickness dimension that is no greater than approximately 0.25 inches.

16. The decorative submersible fish tank sculpture as recited by claim 12 wherein the hollow upright member includes a top and a bottom end and wherein said opening is formed in the top end and opens into the hollow upright member, said top opening being configured to receive particulate materials.

17. The decorative submersible fish tank sculpture as recited by claim 12 wherein said opening is complimentary to a portion of the decorative shape.

18. The decorative submersible fish tank sculpture as recited by claim 12 wherein said base and hollow upright member are integrated and include a forward facing transparent portion.

19. The decorative submersible fish tank sculpture as recited by claim 12 wherein said hollow upright member includes a back surface with a fish tank filter receiving indentation formed therein.

* * * * *